(12) United States Patent
Yebka et al.

(10) Patent No.: US 8,729,862 B2
(45) Date of Patent: May 20, 2014

(54) CONTROLLED REGENERATION OF SOLID ELECTROLYTE INTERFACE FOR PROLONGED CYCLING OF LITHIUM BATTERIES (75) Inventors: Bouziane Yebka, Apex, NC (US); Joseph Anthony Holung, Wake Forest, NC (US); Tin-Lup Wong, Chapel Hill, NC (US); Jeremy Robert Carlson, Cary, NC (US); Kenneth Scott Seethaler, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 747 days.

(21) Appl. No.: 12/972,210

(22) Filed: Dec. 17, 2010

(65) Prior Publication Data
US 2012/0153902 A1 Jun. 21, 2012

(51) Int. Cl.
*H02J 7/00* (2006.01)

(52) U.S. Cl.
USPC ............ 320/132; 320/128; 320/131; 320/134

(58) Field of Classification Search
CPC ........................................................ Y02E 60/12
USPC ........................................................ 320/132
See application file for complete search history.

(56) References Cited

U.S. PATENT DOCUMENTS

2004/0222768 A1* 11/2004 Moore et al. .................. 320/128

* cited by examiner

*Primary Examiner* — Edward Tso
*Assistant Examiner* — Ahmed Omar
(74) *Attorney, Agent, or Firm* — John L. Rogitz (57) ABSTRACT A system implements a first charging method or a second charging method during one or more charge cycles of a battery. The first charging method includes a first voltage charging level and the second charging method includes a second voltage charging level that is higher than the first charging level.

16 Claims, 7 Drawing Sheets

CONTROLLED REGENERATION OF SOLID ELECTROLYTE INTERFACE FOR PROLONGED CYCLING OF LITHIUM BATTERIES

TECHNICAL FIELD

The present disclosure relates to dynamically charging a lithium battery. More particularly, the present disclosure relates to managing a lithium battery's solid electrolyte interface thickness during battery recharge cycles in order to prolong the life of the battery.

BACKGROUND

A lithium battery internally develops a solid electrolyte interface (SEI) passivation layer at one or more of the battery's electrode surfaces during the battery's initial charging cycles. The SEI passivation layer forms when the battery's electrolyte/salt system decomposes on the surface of the battery's electrodes. Once formed, the SEI passivation layer protects the battery's electrode active materials from further reactions with the battery's electrolyte components.

SUMMARY

A system implements a first charging method or a second charging method during one or more charge cycles of a battery. The first charging method includes a first voltage charging level and the second charging method includes a second voltage charging level that is higher than the first charging level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
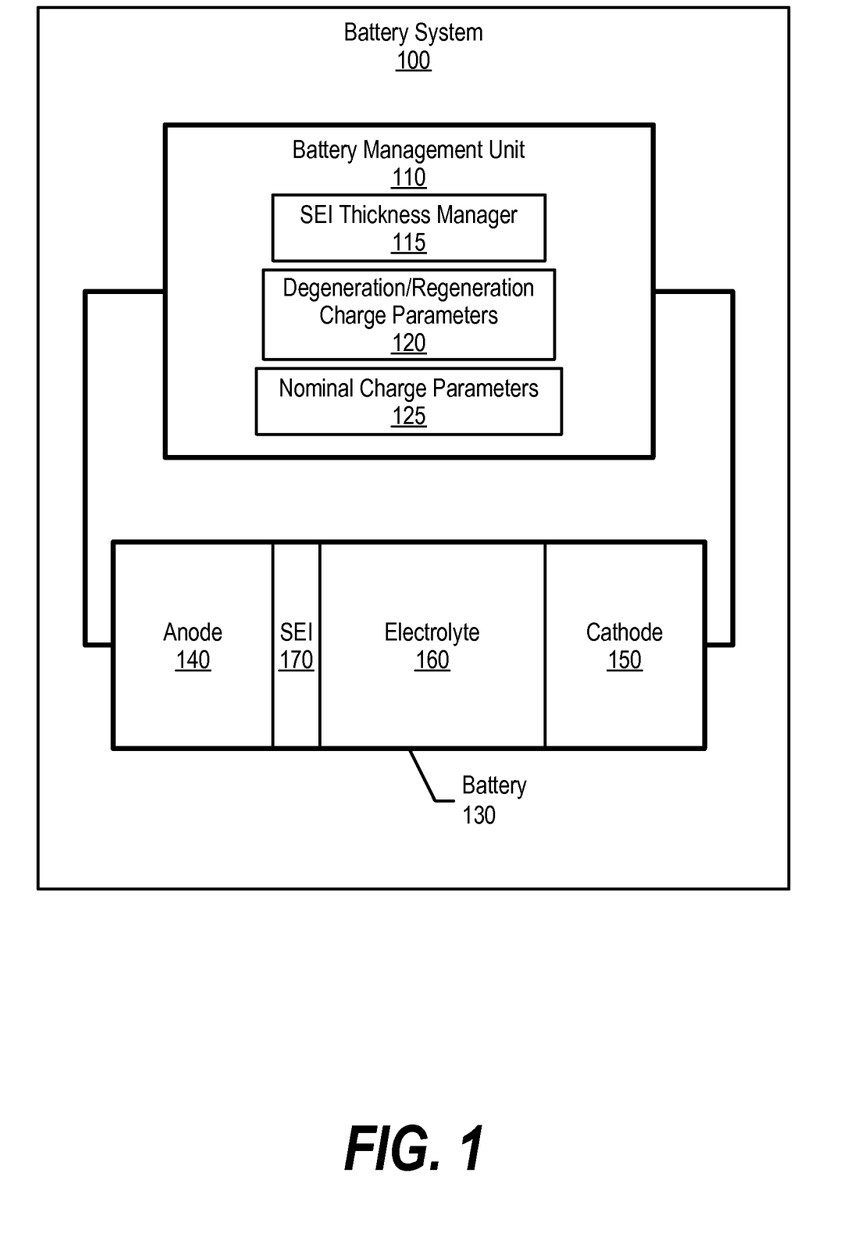
FIG. 1 is a diagram showing a battery system that includes a battery and a battery management unit.

FIG. 1 is a diagram showing a battery system that includes a battery and a battery management unit. Battery system 100 includes battery 130, which provides electrical power to an apparatus, such as an electronic system or transportation vehicle. Battery 130, in one embodiment, is a lithium battery, which includes anode 140, cathode 150, and electrolyte 160. During battery 130's initial charge cycles (generation stage), solid electrolyte interface (SEI) 170 forms on anode 140, which protects anode 140's active materials from further reactions with electrolyte 160's components. As one skilled in the art can appreciate, SEI 170 may form on cathode 150.

Battery management unit 110 monitors battery 130's parameter values (e.g., voltage, current, temperature, impedance, etc.), and charges battery 130 accordingly. Battery 130's impedance relates to the thickness of SEI 170 and, as SEI 170's thickness increases, so does battery 130's impedance. When battery 130's impedance reaches an impedance threshold (monitored by SEI thickness manager 115), thus indicating that SEI 170's thickness has reached a SEI thickness threshold, battery management unit 110 charges battery 130 according to degeneration/regeneration charge parameters 120. Degeneration/regeneration charge parameters 120 are configured such that, during the battery's degeneration charging stage, SEI 170's thickness is reduced or increased. For example, degeneration/regeneration charge parameters 120 may deactivate voltage limiting and/or temperature limiting in order to reduce SEI 170's thickness (see FIGS. 3A, 3B, and corresponding text for further details). Degeneration/Regeneration charge parameters 120 are also configured such that, during the battery's regeneration charging stage, SEI 170's thickness increases by deactivating voltage limiting and/or temperature limiting (see FIGS. 3A, 3C, and corresponding text for further details).

Battery management unit 110 also includes nominal charge parameters 125, which battery management unit 110 utilizes to charge battery 130 when battery 130's impedance does not reach the impedance parameter threshold (see FIG. 3 and corresponding text for further details).

Figure 5:
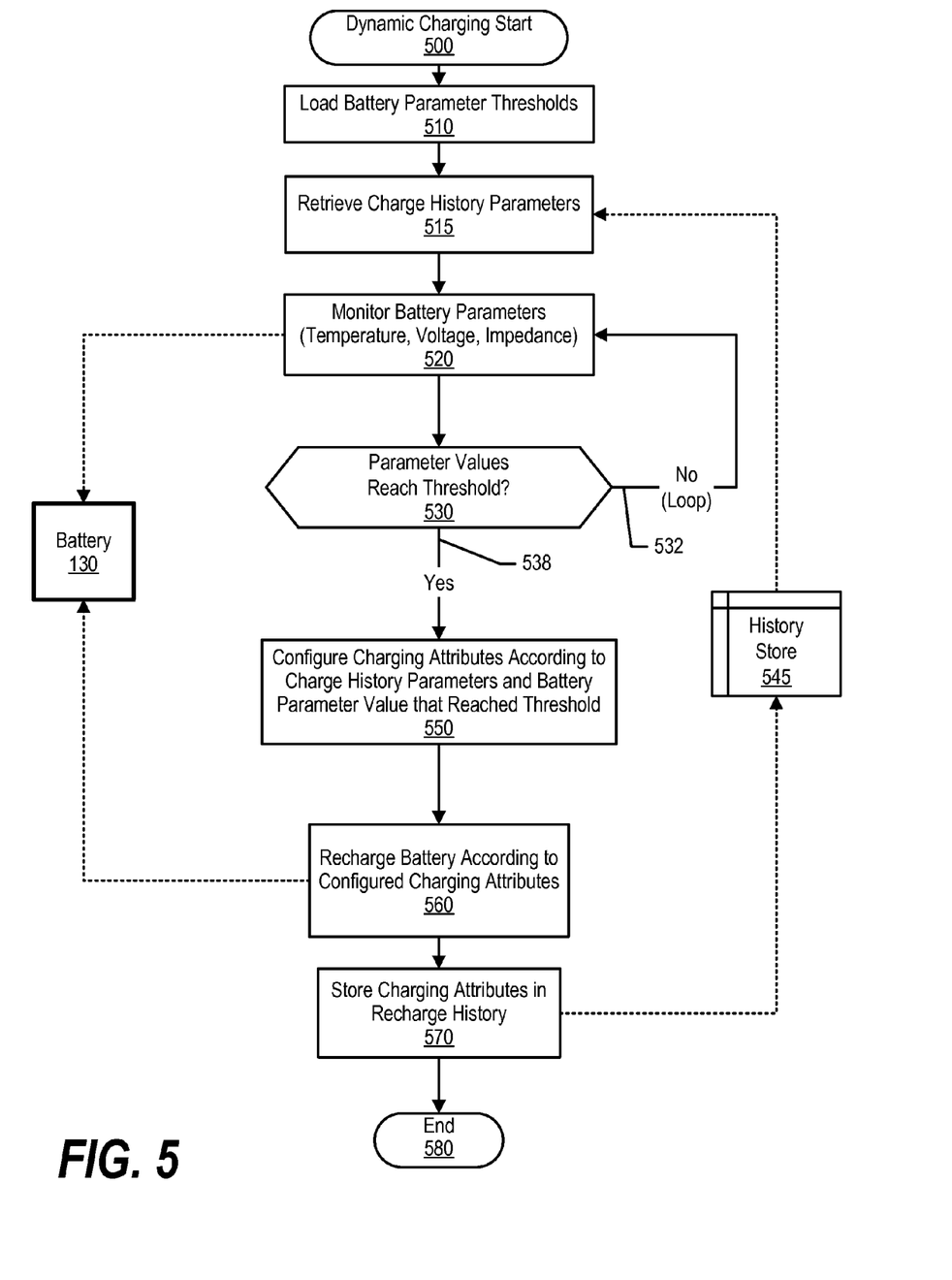
FIG. 5 is a flowchart showing steps taken in monitoring battery parameter values and dynamically charging the battery according to the battery parameter values and charge history parameters.

In one embodiment, battery management unit 110 monitors multiple parameter values and uses prior battery charging history to identify appropriate battery charging parameters to charge battery 130 (see FIG. 5 and corresponding text for further details). In this embodiment, battery management unit 110 controls the rejuvenation process SEI 170 to extend the life of battery 130's by manipulating the voltage, temperature, current and impedance during a charging cycle. For example, battery system 100 may be a battery pack, and battery management unit 110 includes a controller and algorithm that samples the instantaneous health of battery 130 and the state of SEI 170. In this example, battery management unit 110 continuously makes appropriate adjustments, such as selectively manipulating ageing, cycling and storage, in order to achieve maximum cycle life.

In another embodiment, battery management unit 110 may restore degraded cells to a healthier state in order to capture and restore some amount of usable energy that may otherwise not be available. For example, battery management unit 110 may be a self-contained system that allows a user to connect a battery and charge the battery in a manner that reduces the battery's SEI thickness (see FIG. 5 and corresponding text for further details).

Figure 2:
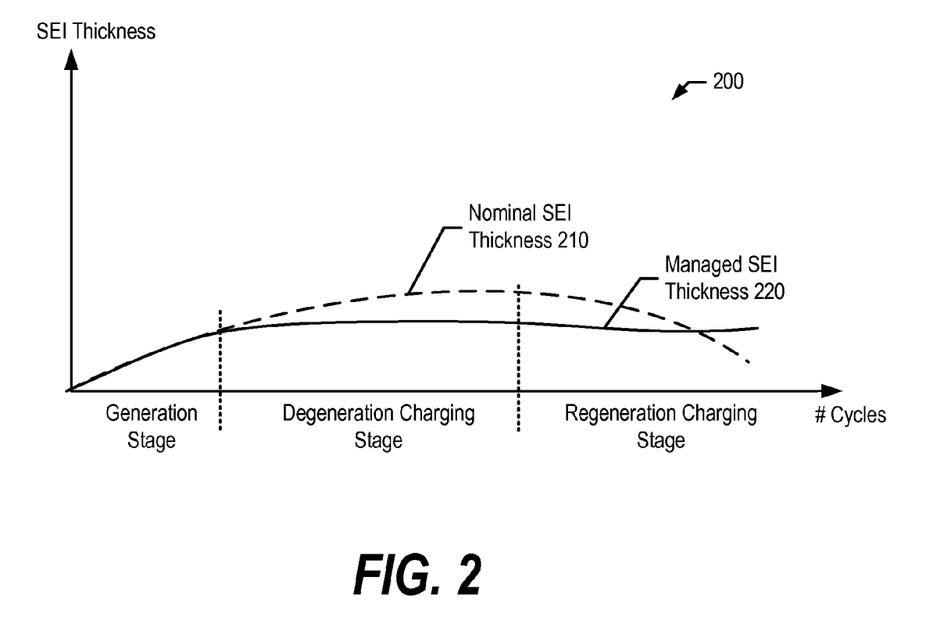
FIG. 2 is a diagram showing controlled SEI growth throughout a battery's lifecycle.

FIG. 2 is a diagram shown controlled SEI thickness growth over a battery's lifecycle. Graph 200 includes three stages, which are a generation stage, a degeneration charging stage, and a regeneration charging stage. During the generation stage, the battery is charged according to nominal charging conditions, such as charging the battery with voltage limits and temperature limits in place. During this stage, the battery develops an SEI layer with an acceptable thickness that protects the battery's electrodes without creating excessive impedance.

During the degeneration charging stage, the battery is charged in a manner that prevents the SEI layer from becoming too thick. As can be seen, nominal SEI thickness 210 increases during this stage, which creates excessive impedance. By charging the battery in a manner that maintains an acceptable SEI thickness (managed SEI thickness 220), the battery's internal impedance created by the SEI layer is also managed (see FIGS. 3A-3B and corresponding text for further details).

During the regeneration charging stage, the battery is charged in a manner that prevents the SEI layer from dissolving. As can be seen, nominal SEI thickness 210 decreases during this stage, which results in the battery's electrodes being susceptible to electrolytic material reactions. By charging the battery in a manner that maintains an acceptable SEI thickness (controlled SEI growth 220), the battery's electrodes stay protected (see FIGS. 3A and 3C and corresponding text for further details).

Figure 3A:
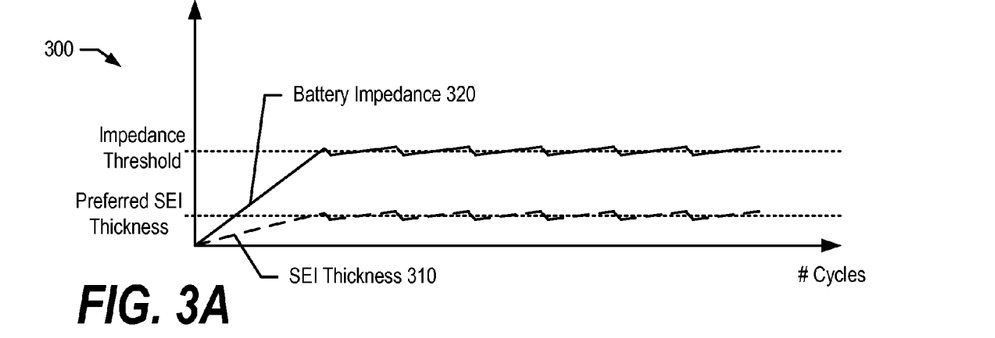
FIG. 3A is a diagram showing battery impedance changes and SEI thickness changes over the course of multiple battery charging cycles.

FIG. 3A is a diagram showing battery impedance changes and SEI thickness changes over the course of multiple battery charging cycles. Graph 300 includes battery impedance 320 and corresponding SEI thickness 310. As a battery proceeds through generation stage charging cycles, SEI thickness 310 begins to increase, which causes battery impedance 320 to increase. When battery impedance 320 reaches an impedance threshold, the battery management unit described herein "free charges" the battery in a manner that reduces SEI thickness 310 during the battery's degeneration charging stage (e.g., deactivating voltage limiting and temperature limiting). In turn, by reducing SEI thickness 310, battery impedance 320 decreases. As a result, by maintaining SEI thickness 310 at a preferred thickness during the battery's degeneration charging stage, battery impedance 320 tends to stabilize, thus extending the life of the battery (see FIGS. 3B, 4, and corresponding text for further details).

During the battery's regeneration charging stage, the battery management unit charges the battery in a manner that increases (regenerates) SEI thickness 310. In turn, by maintaining SEI thickness 310, the battery's electrodes stay protected from electrolyte material reactions. As a result, by maintaining SEI thickness 310 at a preferred thickness during the battery's degeneration charging stage, battery impedance 320 tends to stabilize, thus extending the life of the battery (see FIGS. 3C, 5, and corresponding text for further details). In one embodiment, the battery management unit analyzes temperature and storage history in order to determine a point at which the battery enters the regeneration charging stage.

Figure 3B:
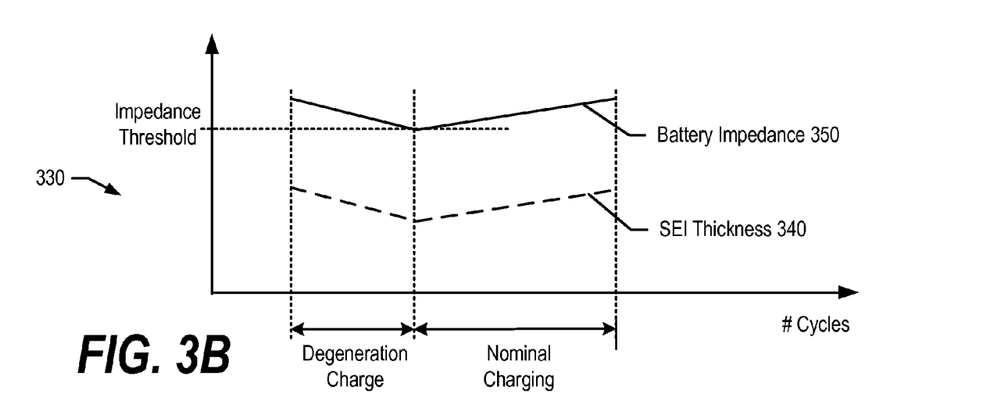
FIG. 3B is a diagram showing an exploded view of graph 200 during a battery's degeneration charging stage.

FIG. 3B is a diagram showing an exploded view of graphs 200 and 300 during the battery's degeneration charging stage. Graph 330 shows that during a degeneration charge cycle, SEI thickness 340 decreases, thus decreasing battery impedance 350. SEI thickness 340 decreases during this time because, during the degeneration charging cycle, the battery management unit deactivates voltage and temperature limits.

Graph 330 also shows that, once battery impedance 350 reaches an acceptable level, the battery management unit charges the battery according to nominal charging parameters (voltage limits and temperature limits), which causes SEI thickness to gradually increase, thus causing battery impedance 350 to gradually increase. In one embodiment, the battery management unit sets limits on cycle numbers and age in addition to, or instead of, impedance values (see FIG. 5 and corresponding text for further details).

Figure 3C:
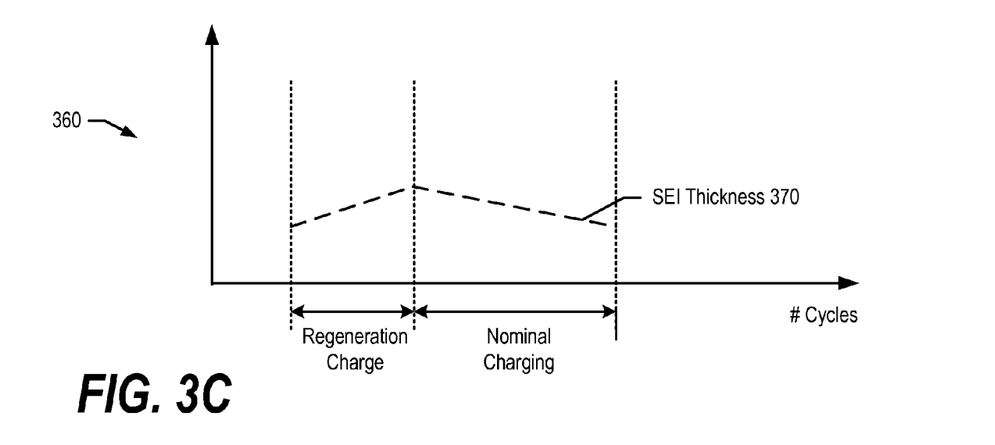
FIG. 3C is a diagram showing an exploded view of graph 200 during a battery's regeneration charging stage.

FIG. 3C is a diagram showing an exploded view of graphs 200 and 300 during a battery's regeneration charging stage charging cycles. Graph 360 shows that during a regeneration charging cycle, SEI thickness 370 regenerates (increases). In one embodiment, the battery management unit charges the battery using a regeneration charge a number of cycles based upon the battery's charge history parameters. Once the SEI thickness builds up to an acceptable level, the battery management unit charges the battery using nominal charging methods.

Figure 4:
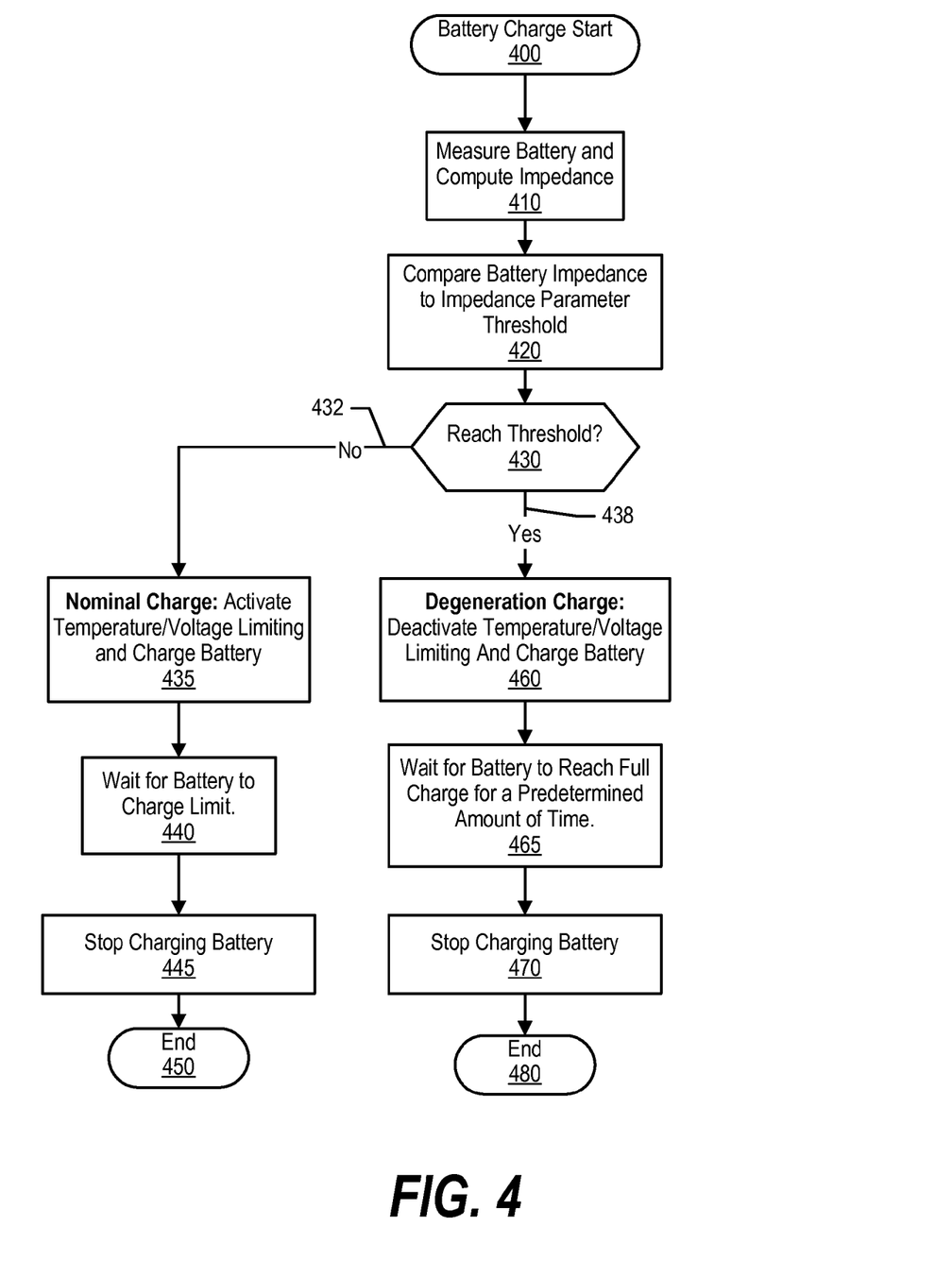
FIG. 4 is a flowchart showing steps taken in charging a battery according to the battery's parameter values.

FIG. 4 is a flowchart showing steps taken in charging a battery according to one or more of the battery's parameter values. Processing commences at 400, whereupon the battery management unit receives one or more battery parameter values and computes the battery's impedance at step 410. For example, the battery management unit may apply a load to the battery and measures the current that passes through the load. In this embodiment, the battery management unit then computes the battery's impedance by the formula Resistance=Voltage/Current. As discussed herein, the battery management unit may use the battery's impedance as an indicator during the battery's degeneration charging stage, and use the battery's history (age, number of cycles, etc.) during the battery's regeneration charging stage (see FIG. 5 and corresponding text for further details).

Next, the battery management unit compares the battery impedance against an impedance parameter threshold (step 420). The impedance parameter threshold corresponds to the preferred SEI thickness internal to the battery (see FIGS. 3A, 3B, and corresponding text for further details).

The battery management unit determines whether the battery's impedance reached the impedance parameter threshold (decision 430). If the battery's impedance did not reach the threshold, decision 430 branches to "No" branch 432, whereupon the battery management unit charges the battery using a nominal charging approach (e.g., a first charging method), which activates voltage limiting and temperature limiting (step 435). In one embodiment, the nominal charge is a standard charging cycle, which charges the battery until the battery charge limit (step 440). At this point, the battery management unit stops charging the battery and ends at 450. In one embodiment, the battery management unit stores charging history for later recall and battery charging computations (see FIG. 5 and corresponding text for further details).

Referring back to decision 430, when the battery's impedance reaches the impedance parameter threshold, decision 430 branches to "Yes" branch 438, whereupon the battery management unit deactivates temperature limiting and voltage limiting in order to charge the battery (degeneration charge) and reduce the battery's SEI thickness (e.g., a second charging method) (step 460). In one embodiment, the battery management unit continues to charge the battery until the battery reaches full charge for a predetermined amount of time (step 465). In another embodiment, the battery management unit monitors the battery's impedance during the degeneration charge cycle and continues to charge the battery until the battery's impedance reduces to an acceptable level. At step 470, the battery management unit stops charging the battery and ends at 480. In one embodiment, as discussed above, the battery management unit stores charging history for later recall and battery charging computations (see FIG. 4 and corresponding text for further details).

FIG. 5 is a flowchart showing steps taken in monitoring battery parameter values and dynamically charging the battery according to the battery parameter values and charge history parameters. Processing commences at 500, whereupon the battery management unit loads battery parameter thresholds at step 510. The battery parameter thresholds may include, for example, a voltage parameter threshold, a temperature parameter threshold, and/or an impedance parameter threshold.

At step 515, the battery management unit retrieves charge history parameters from history store 545. The charge history parameters include, for example, the number of times battery 130 has been charged; the voltage applied to battery 130 during the previous charge cycles; the amount of time of the previous charge cycles; and etcetera. History store 545 may be stored on a volatile or nonvolatile storage area, such as computer memory or a computer hard drive.

The battery management unit monitors and receives battery 130's parameter values during operation (step 520), and determines whether one or more of the parameter values reaches one of the loaded parameter thresholds (decision 530). If battery 130's parameter values do not reach the parameter thresholds, decision 530 branches to "No" branch 532, which loops back to continue to monitor battery 130. This looping continues until one or more of battery 130's parameter values reaches one of the parameter thresholds, at which point decision 530 branches to "Yes" branch 538. In one embodiment, the battery management unit may analyze the charge history parameters and/or the age of the battery when determining how to charge battery 130.

Next, the battery management unit configures battery charging parameters for charging battery 130 based upon the charge history parameters and/or the battery parameters that reached their corresponding thresholds (step 550). At step 560, the battery management unit charges battery 130 according to the configured charging parameters in step 550 and based upon whether the battery is in a degeneration charging stage or a regeneration charging stage. In one embodiment, the battery management unit identifies the battery's stage based upon age and cycle history. In another embodiment, the battery management unit cycles and charges the battery 130 to increase the SEI thickness. In another embodiment, the battery management unit charges battery 130 to a predetermined charge state (e.g., fully charged), and continues to charge battery 130 and may also increase the voltage to a maximum charging level in order to increase battery 130's temperature.

In yet another embodiment, the battery management unit monitors a battery temperature and compares it to a temperature threshold. In this embodiment, the battery management unit charges the battery according to a nominal charging method when the battery is below the temperature threshold, and charges the battery using more extreme charging techniques (e.g., higher voltage) when the battery temperature is above the temperature threshold. The battery management unit stores the charging parameters in history store 545 at step 570, and ends at 580.

Figure 6A:
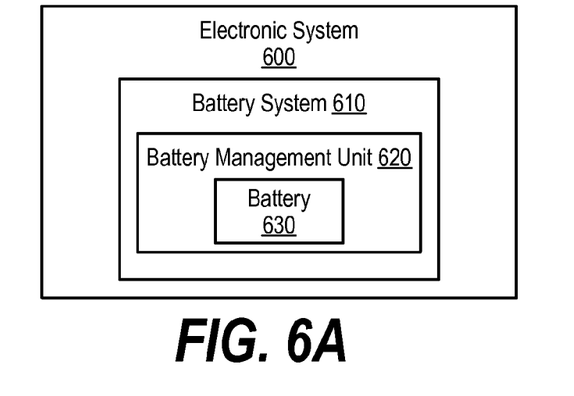
FIG. 6A is a diagram showing an electronic system utilizing a battery system with SEI management capabilities as discussed herein.

FIG. 6A is a diagram showing an electronic system utilizing a battery system with SEI management capabilities as discussed herein. Electronic system 600 may be, for example, a computer system, a cell phone, a medical device, an electronic toy, and etcetera. Battery system 610 includes a battery (battery 630), and battery management unit 620. When battery 630's parameter values reach a threshold, battery management unit 620 charges battery 630 accordingly in order to maintain battery 630's SEI at a acceptable thickness.

Figure 6B:
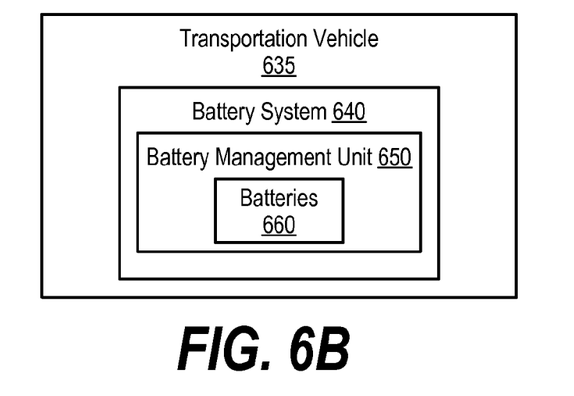
FIG. 6B is a diagram showing a transportation vehicle utilizing a battery system with neutralization capabilities as discussed herein.

FIG. 6B is a diagram showing a transportation vehicle utilizing a battery system with neutralization capabilities as discussed herein. Transportation vehicle 635 may be, for example, an electric car, an electric bus, a commuter rail system with backup power capability, and etcetera. Battery system 640 may include a bank of batteries 660. As discussed above, when batteries 660's parameter values reach a threshold, battery management unit 650 charges batteries 660 accordingly in order to maintain batteries 660's SEI at a acceptable thickness.

Figure 6C:
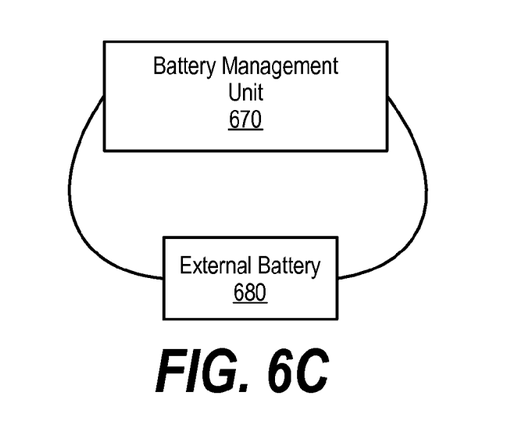
FIG. 6C is a diagram showing a battery charging station, such as a kiosk, to recharge in a manner that reduces the battery's SEI thickness.

FIG. 6C is a diagram showing a battery charging station, such as a kiosk, to recharge in a manner that reduces the battery's SEI thickness. Battery management unit 670 allows a user to connect external battery 680, which battery management unit 670 charges according to external battery 680's parameter values (e.g., impedance value). In one embodiment, a user enters external battery 680's information (model number), and battery management unit accesses a lookup table to identify external battery 680's parameter thresholds. In turn, battery management unit 670 charges external battery 680 as discussed herein.

Figure 7:
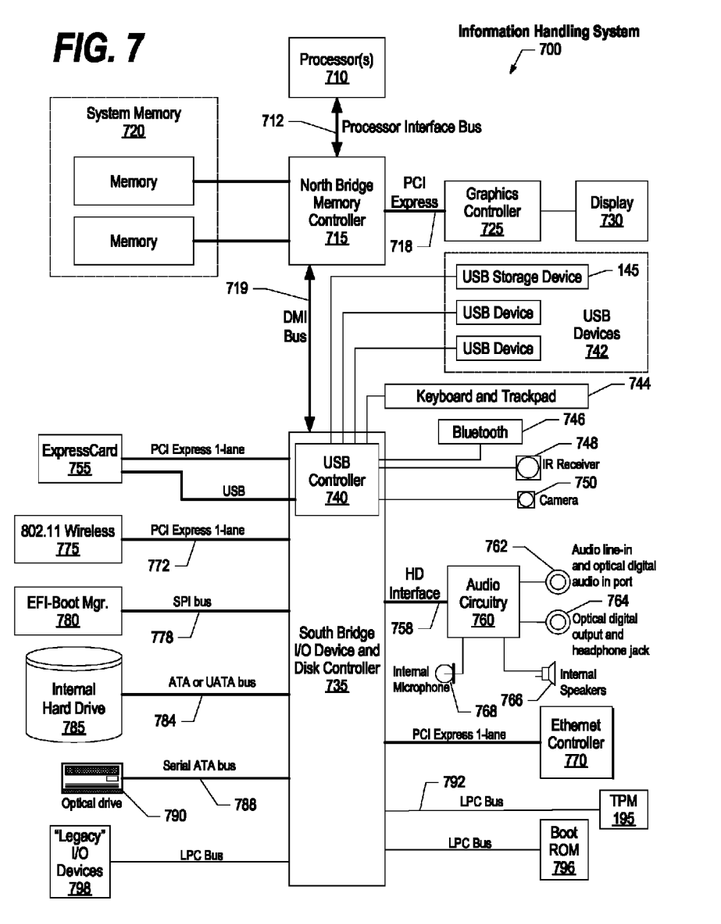
FIG. 7 is a block diagram example of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wirelessly communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A method comprising:
   implementing a first charging method during one or more charge cycles of a battery, the first charging method including a first voltage charging level; and
   implementing a second charging method during one or more charge cycles of the battery, wherein the second charging method includes a second voltage charging level that is higher than the first charging level; wherein the method includes determining that the battery is fully charged using the first charging method and implementing the second charging method in response to determining that the battery is fully charged.

2. The method of claim 1 wherein the second charging method is implemented in succession of the first charging method after the first charging method has been implemented on the battery that places the battery in a predetermined charge state.

3. The method of claim 1 further comprising:
   determining that the battery has aged for a predetermined amount of time; and
   implementing the second charging method in response to determining that the battery has aged for the predetermined amount of time.

4. The method of claim 1 further comprising:
   implementing the first charging method more frequently than the second charging method.

5. The method of claim 1 wherein the first voltage charging level is a level below a maximum charging level specified for the battery.

6. The method of claim 1 wherein the second voltage charging level is a level in proximity to a maximum charging level specified for the battery.

7. A system comprising:
   one or more system components that consume power;
   a battery that provides power to the one or more system components; and
   a battery management unit that charges the battery, wherein the battery management unit performs steps that include:
   responsive to determining that a battery impedance of the battery is below an impedance threshold, charging the battery at a first voltage level; and
   responsive to determining that the battery impedance is above the impedance threshold, charging the battery at a second voltage level, the second voltage level being higher than the first voltage level.

8. The system of claim 7 wherein the battery management unit further performs steps that include:
   determining that the battery is fully charged using the first charging method; and
   charging the battery at a second voltage level in response to determining that the battery is fully charged.

9. The system of claim 7 wherein the charging the battery at a second voltage level is implemented in succession of charging the battery at a first voltage level after the charging the battery at a first voltage level has been implemented on the battery that places the battery in a predetermined charge state.

10. The system of claim 7 wherein the battery management unit further performs steps that include:
   determining that the battery has aged for a predetermined amount of time; and
   charging the battery at a second voltage level in response to determining that the battery has aged for the predetermined amount of time.

11. The system of claim 7 wherein:
   the first voltage level is a level below a maximum charging level specified for the battery; and
   the second voltage level is a level in proximity to a maximum charging level specified for the battery.

12. The system of claim 7 wherein the one or more system components further comprise:
   one or more processors;
   a memory accessible by at least one of the processors; and
   a nonvolatile storage area accessible by at least one of the processors.

13. The system of claim 7 wherein the one or more system components comprise a motor included in a transportation vehicle, wherein the motor receives power from the battery in order to propel the vehicle.

14. A method comprising:
   identifying a first temperature associated with a machine;
   comparing the first temperature with a temperature threshold;
   in response to determining that the first temperature is lower than the temperature threshold, implementing a first charging method during a first charge cycle of a battery, the first charging method including a first voltage charging level; and
   in response to determining that the first temperature is higher than the temperature threshold, implementing a second charging method during a second charge cycle of the battery, wherein the second charging method includes a second voltage charging level that is higher than the first charging level.

15. The method of claim 1 wherein the first temperature is a temperature selected from the group consisting of a temperature of the battery, a temperature of the machine, and an ambient temperature.

16. The system of claim 7, wherein the battery management unit is configured to, upon determining that battery impedance is above the impedance threshold, charge the battery at the second voltage level until battery impedance is reduced to below the threshold and/or charge the battery at the second voltage level for a predetermined amount of time.

* * * * *